(12) United States Patent
Kaneko

(10) Patent No.: US 11,709,630 B2
(45) Date of Patent: Jul. 25, 2023

(54) NON-VOLATILE MEMORY SYSTEM, CONTROLLER FOR NON-VOLATILE MEMORY SYSTEM, AND WEAR LEVELING METHOD FOR NON-VOLATILE MEMORY SYSTEMS

(71) Applicant: KIOXIA CORPORATION, Tokyo (JP)

(72) Inventor: Akiyuki Kaneko, Yokohama Kanagawa (JP)

(73) Assignee: Kioxia Corporation, Tokyo (JP)

( * ) Notice: Subject to any disclaimer, the term of this patent is extended or adjusted under 35 U.S.C. 154(b) by 33 days.

(21) Appl. No.: 17/459,956

(22) Filed: Aug. 27, 2021

(65) Prior Publication Data

US 2022/0283741 A1 Sep. 8, 2022

(30) Foreign Application Priority Data

Mar. 4, 2021 (JP) ................................ 2021-034530

(51) Int. Cl.
*G06F 12/00* (2006.01)
*G06F 3/06* (2006.01)
*G06F 12/02* (2006.01)

(52) U.S. Cl.
CPC .......... *G06F 3/0659* (2013.01); *G06F 3/0604* (2013.01); *G06F 3/0619* (2013.01); *G06F 3/0653* (2013.01); *G06F 3/0679* (2013.01); *G06F 12/0246* (2013.01); *G06F 2212/7211* (2013.01)

(58) Field of Classification Search
CPC .... G06F 3/0659; G06F 3/0604; G06F 3/0619; G06F 3/0653; G06F 3/0679; G06F 12/0246; G06F 2212/7211

USPC ......................................................... 711/154
See application file for complete search history.

(56) References Cited

U.S. PATENT DOCUMENTS

| | | | | |
|---|---|---|---|---|
| 10,223,004 | B2 * | 3/2019 | Sethuraman | G06F 3/0613 |
| 10,861,580 | B2 * | 12/2020 | Kanno | G11C 29/76 |
| 2013/0346708 | A1 * | 12/2013 | Nashimoto | G06F 3/067 |
| | | | | 711/E12.103 |
| 2017/0060425 | A1 * | 3/2017 | Sun | G11C 16/10 |
| 2017/0286293 | A1 | 10/2017 | Gayman et al. | |
| 2020/0234352 | A1 | 7/2020 | Saley et al. | |

(Continued)

FOREIGN PATENT DOCUMENTS

| | | |
|---|---|---|
| JP | 5943153 B2 | 6/2016 |
| TW | I592800 B * | 7/2017 |

*Primary Examiner* — Mardochee Chery
(74) *Attorney, Agent, or Firm* — Kim & Stewart LLP

(57) ABSTRACT

A memory system includes a nonvolatile memory and a controller. The nonvolatile memory has first regions in which data writes and data reads can be executed in parallel. Each of the first regions has second regions which are each a data write/read unit. The controller acquires first values indicating a data write load for each of the first regions, detects a first region having a first value greater than or equal to a first threshold, acquires second values indicating a data write load for each of the plurality of second regions in the detected first region, detects a second region having a second value greater than or equal to a second threshold but less than or equal to a third threshold that is higher than the second threshold, and then move data from the detected second region to a second region in another first region.

20 Claims, 12 Drawing Sheets

(56) References Cited

U.S. PATENT DOCUMENTS

2021/0158867 A1\* 5/2021 Hara ..................... G06F 3/0619
2021/0263674 A1\* 8/2021 Shin ...................... G11C 16/26

\* cited by examiner

NON-VOLATILE MEMORY SYSTEM, CONTROLLER FOR NON-VOLATILE MEMORY SYSTEM, AND WEAR LEVELING METHOD FOR NON-VOLATILE MEMORY SYSTEMS

CROSS-REFERENCE TO RELATED APPLICATION

This application is based upon and claims the benefit of priority from Japanese Patent Application No. 2021-034530, filed Mar. 4, 2021, the entire contents of which are incorporated herein by reference.

FIELD

Embodiments described herein relate generally to a memory system, a controller in a memory system, and a wear leveling method implemented in a memory system.

BACKGROUND

In recent years, memory systems including nonvolatile memory chips have become widely used. In this type of memory system, data movement for leveling (wear leveling) the number of times data is written (write count) across the different regions of the nonvolatile memory is performed.

DETAILED DESCRIPTION

One embodiment of the present disclosure provides a memory system, a controller, and a wear leveling method capable of performing wear leveling in consideration of the bias of a data write load to some regions of a nonvolatile memory.

In general, according to one embodiment, a memory system includes a nonvolatile memory and a controller. The nonvolatile memory includes a plurality of first regions in which a plurality of data writes or reads can be executed in parallel. Each of the plurality of first regions has a plurality of second regions which are each a data write/read unit (e.g., a minimum unit size for a data read or data write operation). The controller controls the nonvolatile memory. The controller acquires first values indicating a data write load for each of the plurality of first regions, detects a first region having a first value greater than or equal to a first threshold, acquires second values indicating a data write load for each of the plurality of second regions in the detected first region, detects a second region having a second value greater than or equal to a second threshold but less than or equal to a third threshold higher that is than the second threshold, and then moves data from the detected second region to a second region in a different first region.

Hereinafter, certain example embodiments will be described with reference to drawings.

First Embodiment

Figure 1:
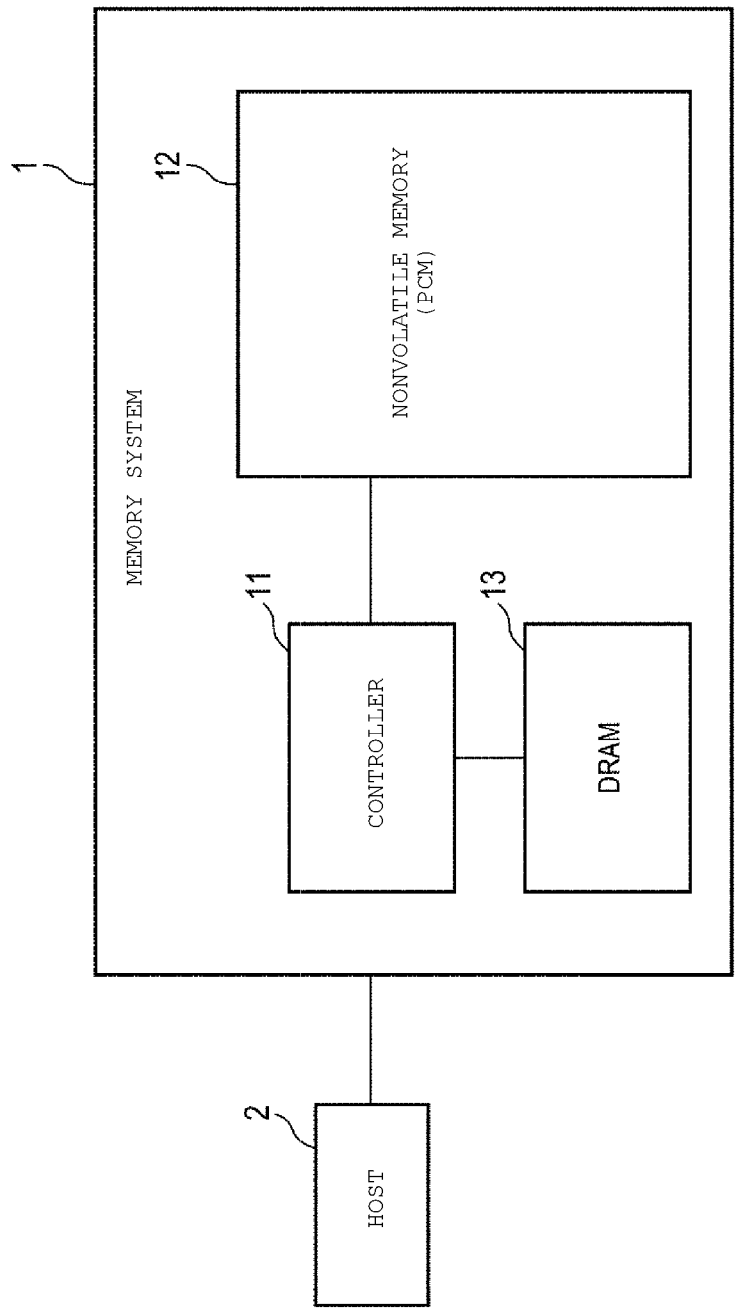
FIG. 1 is a diagram illustrating a memory system of a first embodiment.

FIG. 1 is a diagram illustrating a configuration example of the memory system 1 of the first embodiment. FIG. 1 also illustrates a configuration example of an information processing system in which a memory system 1 is connected to a host 2.

The memory system 1 includes a controller 11, a nonvolatile memory 12, and a dynamic random access memory (DRAM) 13.

The controller 11 controls the operation of the memory system 1 in an integrated manner. Specifically, the controller 11 controls the nonvolatile memory 12 and the DRAM 13. For example, in accordance with a command from the host 2, the controller 11 uses the DRAM 13 as a buffer to execute a write operation to write data to the nonvolatile memory 12 and a read operation to read data from the nonvolatile memory 12. The controller 11 may be configured as a system-on-a-chip (SoC) or the like. The controller 11 may use an internal memory such as static RAM (SRAM) as a buffer. When various working regions including a buffer can be provided on the internal memory, the memory system 1 does not necessarily have to be equipped with the DRAM 13 as a separate element.

The controller 11 can also executes the read operation to read data from the nonvolatile memory 12 and the write operation to write data to the nonvolatile memory 12 for the purpose of moving data stored in the nonvolatile memory 12 from one location to another for the purpose of maintaining a long service lifetime. Such processing may be initiated independently from a command from the host 2. This movement of data on the nonvolatile memory 12 is usually called "wear leveling" or the like. In the memory system 1 of the first embodiment, the controller 11 performs wear leveling in consideration of a bias in a data write load to some regions of the nonvolatile memory 12.

The nonvolatile memory 12 is, for example, a phase change memory (PCM). The nonvolatile memory 12 is not limited to PCM, and may be magnetoresistive RAM (MRAM), resistive RAM (ReRAM), ferroelectric RAM (FeRAM), nanotube RAM (NRAM), or the like in other examples.

Figure 2:
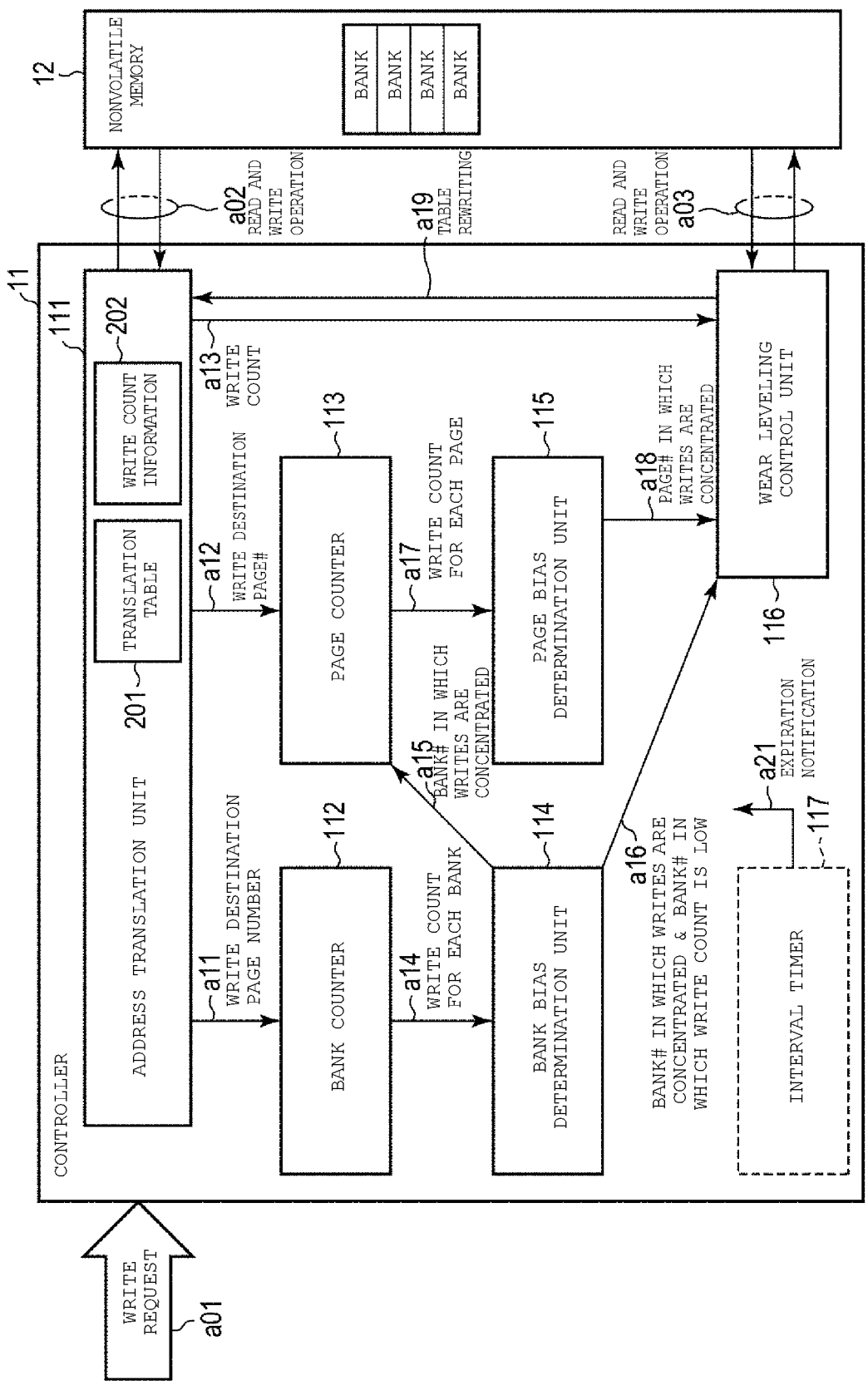
FIG. 2 is a diagram illustrating a functional blocks related to wear leveling by a controller in a memory system of the first embodiment.

FIG. 2 is a diagram illustrating an example of functional blocks related to wear leveling by the controller 11 in the memory system 1 of the first embodiment.

The controller 11 includes an address translation unit 111, a bank counter 112, a page counter 113, a bank bias determination unit 114, a page bias determination unit 115, a wear leveling control unit 116, and an interval timer 117. The address translation unit 111, the bank bias determination unit 114, the page bias determination unit 115, the wear leveling control unit 116, and the interval timer 117 may be implemented by hardware such as an electronic circuit, or may be implemented by a processor incorporated in the controller 11 executing a program.

In FIG. 2, it is assumed that the bank counter 112 and the page counter 113 are provided on the internal memory (SRAM or the like) or an internal register of the controller 11. Alternatively, the bank counter 112 and the page counter 113 may be provided on the DRAM 13.

When a write command (write request a01) requesting a data write is received from the host 2, the address translation unit 111 executes address translation for converting the logical address passed from the host 2 indicating a data write position to a physical address indicating a physical position within the nonvolatile memory 12.

Also, similarly, when a read command (read request) requesting a data read is received from the host 2, the address translation unit 111 executes address translation for converting the logical address used by the host 2 for specifying a data read position into a physical address within the nonvolatile memory 12. The address translation unit 111 issues a data write request or a data read request to the nonvolatile memory 12 by using the physical address obtained by the address translation (a02).

As described above, the controller 11 may also execute write operations and read operations for purposes of wear leveling (a03) of the nonvolatile memory 12. The wear leveling control unit 116 issues a data write request or a data read request for these operations. In the following, "reading" is referred to as a "read", and "writing" is referred to as a "write".

Figure 3:
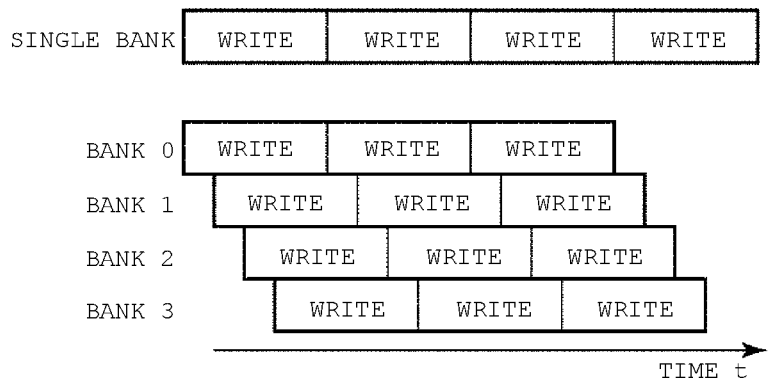
FIG. 3 is a diagram illustrating an example of an interleaving operation.

In the memory system 1 of the first embodiment, it is assumed that the nonvolatile memory 12 in which the controller 11 performs data writes and data reads is divided into a plurality of regions. In this description, each of the plurality of regions is referred to as a bank. A bank is a unit that the controller 11 can access in parallel. Dividing the nonvolatile memory 12 into a plurality of banks aims to improve the performance by permitting interleaving. FIG. 3 illustrates an example of an interleaving operation.

FIG. 3 illustrates an example of an interleaving operation in which data is written to four banks in parallel, as compared with a case where the same data is written to a single bank. Assuming that the nonvolatile memory 12 is divided into four banks, the performance of the memory system 1 is theoretically improved up to 4 times as compared with the case where the nonvolatile memory 12 is not divided into a plurality of banks.

Figure 4:
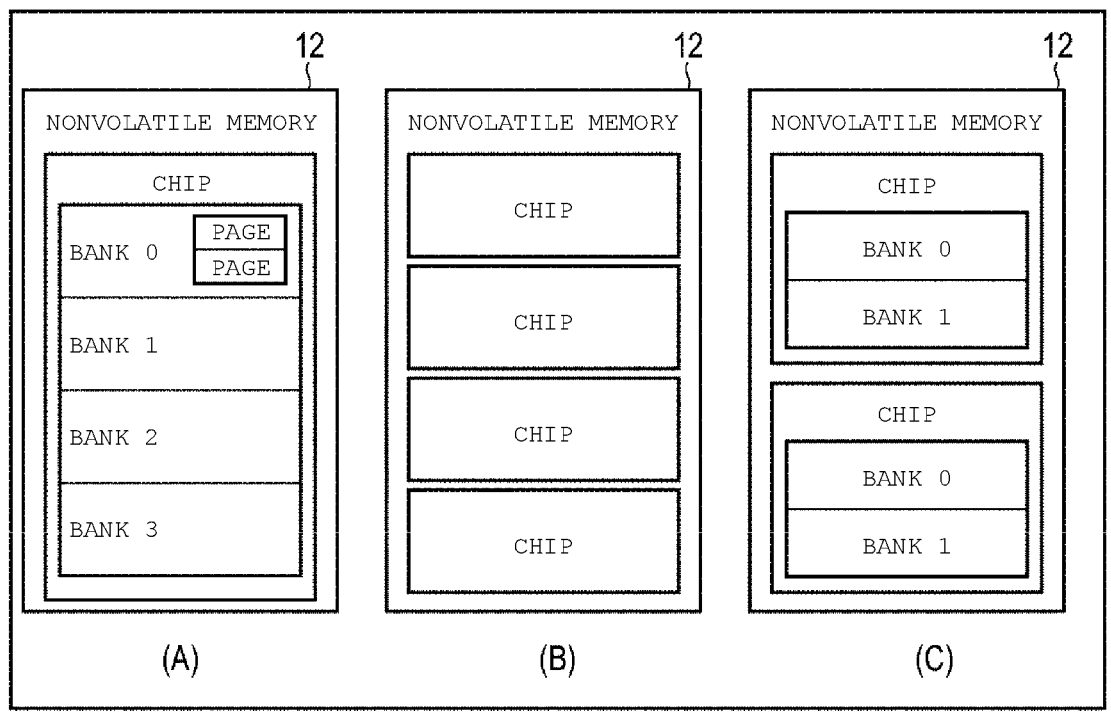
FIG. 4 is a diagram illustrating a nonvolatile memory divided into a plurality of regions.

As illustrated in FIG. 4, several methods can be adopted for dividing the nonvolatile memory 12 into a plurality of regions for purposes of interleaving operations.

As illustrated in (A) of FIG. 4, regions (the banks) may be within a single chip, or as illustrated in (B) of FIG. 4, individual chips may be used as the regions (banks). Alternatively, as illustrated in (C) of FIG. 4, a plurality of chips may be used, and each chip may be sub-divided into regions (banks). In each of methods (A) to (C) in FIG. 4, the nonvolatile memory 12 is divided into four regions.

The page illustrated in (A) of FIG. 4 is a unit in which the controller 11 can read and write data. A page is an example of a data write/read unit. Also in the cases of (B) and (C) of FIG. 4, reading and writing of data is executed on a page-by-page basis.

Figure 5:
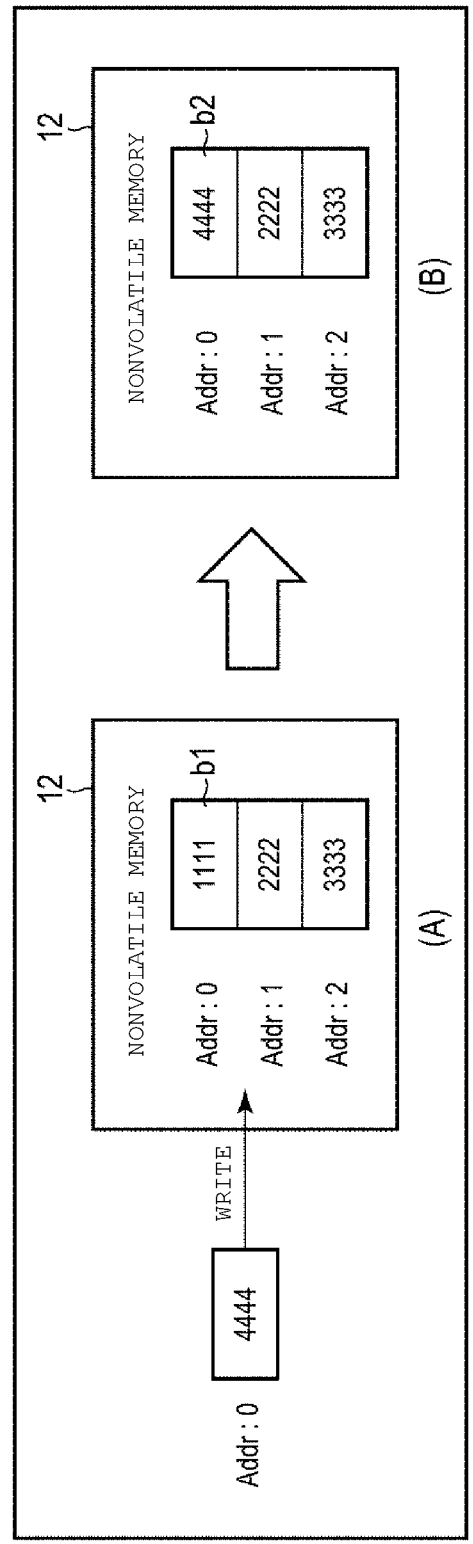
FIG. 5 is a diagram illustrating overwriting data on a nonvolatile memory.

In the present examples, it is assumed that the nonvolatile memory 12 is a memory in which data can be overwritten. FIG. 5 illustrates an example of overwriting data on the nonvolatile memory 12.

For example, as illustrated in (A) of FIG. 5, it is assumed that data "1111" (b1) is stored in a physical address 0 of the nonvolatile memory 12. Further, it is assumed that data "2222" is stored in a physical address 1 and data "3333" is stored in a physical address 2.

The controller 11 can execute a write operation with the physical address 0 as a write destination on the nonvolatile memory 12 in the state illustrated in (A) of FIG. 5. That is, the nonvolatile memory 12 does not require additional operations/work such as erasing of the physical address location before reusing the region in which invalid data is stored. For example, when the controller 11 executes a write operation of data "4444" to the physical address 0, as illustrated in (B) of FIG. 5, data "1111" stored in the physical address 0 of the nonvolatile memory 12 can be directly overwritten with data "4444" (b2). On the other hand, in the nonvolatile memory 12 in which data can be overwritten in this way, there is a possibility that the data write load will be concentrated in one bank (or a subset of banks) among a plurality of banks.

Figure 6:
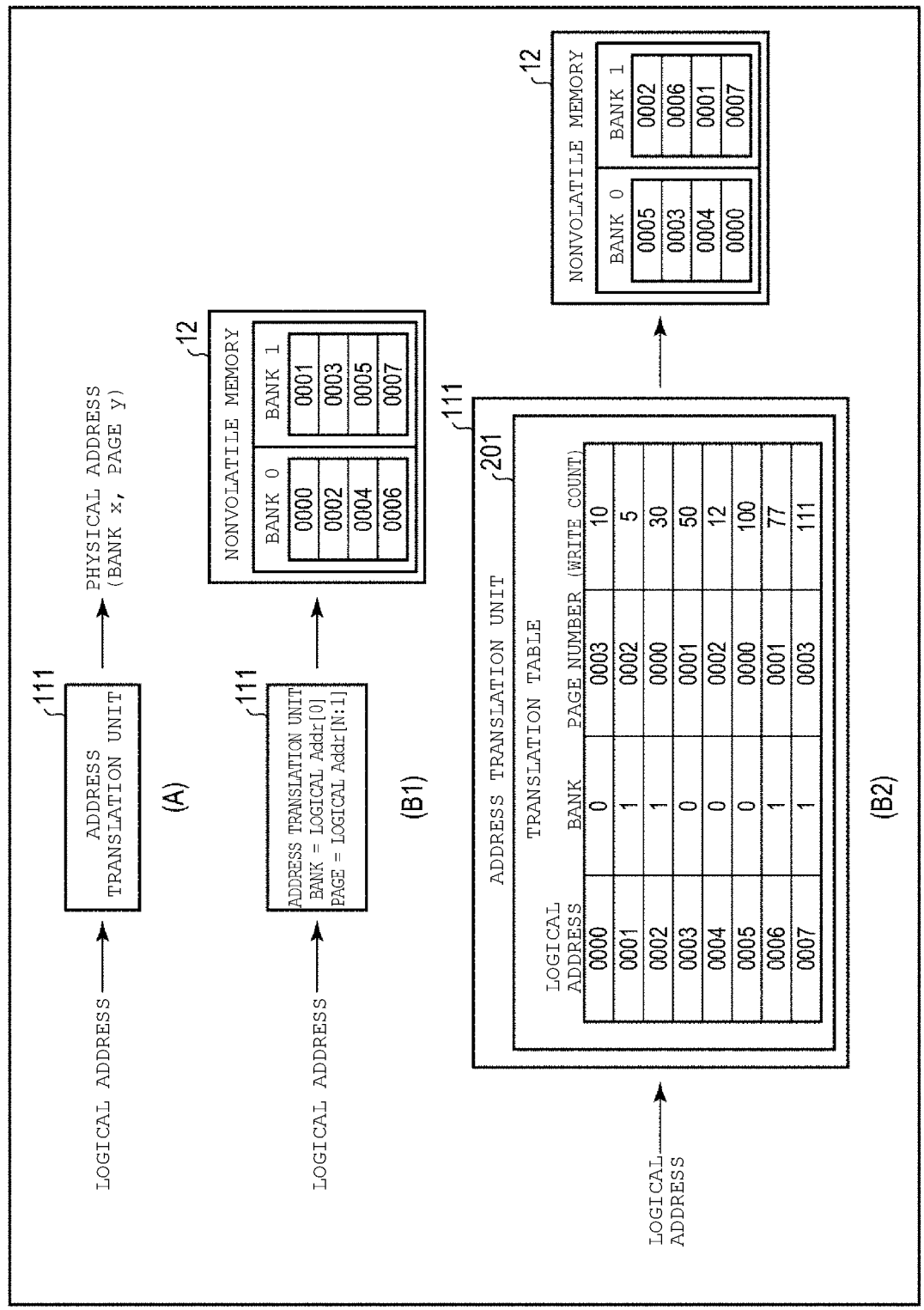
FIG. 6 is a diagram illustrating an outline of address translations from a logical address to a physical address.

FIG. 6 is a diagram illustrating an outline of address translation from a logical address to a physical address by the address translation unit 111.

As illustrated in (A) of FIG. 6, the address translation unit 111 can translate the logical address received from the host 2 into a physical address. In (A) of FIG. 6, the physical address is composed of a combination of a bank identification number ("bank x" in FIG. 6; "bank number" for simplicity) and a page identification number ("page v" in FIG. 6; "page number" for simplicity").

One simple method of address translation is to set the bank number according to the lower bits of the logical address (the lowest bit if there are just two banks) and set the page number according to the remaining upper bits, as illustrated in (B1) of FIG. 6. For example, for logical addresses 0, 2, 4, and 6, bank 0 is selected because the value (its binary value) of the lowest bit is 0. Since the values of the remaining upper bits are 0, 1, 2, and 3, respectively, pages 0, 1, 2, and 3 are selected. For the logical addresses 1, 3, 5, and 7, bank 1 is selected because the value (binary value) of the lowest bit is 1. Since the values of the remaining upper bits are 0, 1, 2, and 3, respectively, pages 0, 1, 2, and 3 are selected.

However, in the method illustrated in (B1) of FIG. 6, since the logical address and the physical address are statically associated with each other, when writes are concentrated on a certain address, the lifetime of the nonvolatile memory 12 may be shortened. Therefore, in general, the method using a translation table 201 illustrated in (B2) of FIG. 6 is applied preferably. This method is also applied to the memory system 1 of the first embodiment.

The translation table 201 stores the correspondence between a logical address and a physical address (bank number+page number). The translation table 201 may also store the write count of each page indicated by the physical address as information for wear leveling. The address translation unit 111 refers to the translation table 201 by using a logical address as a search key and acquires the physical address (bank number+page number) associated with the logical address.

In the method illustrated in (B2) of FIG. 6, since the logical address and the physical address are dynamically associated with each other, when writes are concentrated on a certain logical address, the translation table 201 can be rewritten so that the physical address corresponding to the overused logical address can be replaced (data is moved to a different physical address). Here, it is assumed that the translation table 201 is provided on the internal memory (SRAM or the like) of the controller 11 or on the internal register. Alternatively, the translation table 201 may be provided on the DRAM 13.

Returning to FIG. 2, the description of the functions of controller 11 related to wear leveling by the controller 11 will be continued.

The address translation unit 111 stores or has access to the translation table 201 described with reference to FIG. 6 and write count information 202. The write count information 202 is information regarding the write count of each page. That is, the number of write operations that have been performed on a page. As described above, the write count of each page, that is, write count information 202 maybe saved/stored in the translation table 201.

When the address translation unit 111 receives a write request from the host 2 and converts the logical address specified by the host 2 into a physical address (bank number+page number), the address translation unit 111 notifies the bank counter 112 of the bank number (a11) and also notifies the page counter 113 of the page number (a12) associated with the write request. The address translation unit 111 notifies the wear leveling control unit 116 of the write count information 202 at predetermined times or interval (a13). The address translation unit 111 may also provide the write count information 202 in accordance with a request from the wear leveling control unit 116.

The bank counter 112 adds up (tracks) the write count for each bank in a certain time period based on the notifications from the address translation unit 111. The certain period is timed by the interval timer 117. The interval timer 117 transmits an expiration notification (a21) to the bank counter 112 and the page counter 113 at regular intervals. The bank counter 112 tracks the write count for each bank based on the notifications from the address translation unit 111 from one expiration notification (a21) from the interval timer 117 to the next. The bank counter 112 notifies the bank bias determination unit 114 of the write count for each bank (a14) after receiving an expiration notification from the interval timer 117 or the like.

The bank bias determination unit 114 detects the occurrence of a bias in the write count between the different banks based on the write counts for each bank received from the bank counter 112. For example, if the ratio of the write count of any one bank to the total write count of all banks is greater than or equal to a certain percentage (first threshold), the bank bias determination unit 114 determines that a bias has occurred in the write count. The bank bias determination unit 114 detects when writes are concentrated in a specific bank and also detects a bank that has a low write count. When detecting the occurrence of a bias in the write count, the bank bias determination unit 114 notifies the page counter 113 of the bank number (bank#) of the bank in which the writes have been concentrated (a15). The bank bias determination unit 114 also notifies the wear leveling control unit 116 of the bank number (bank#) of the bank in which writes have been concentrated and the bank number (bank#) of the bank for which the write count is low (a16).

Figure 7:
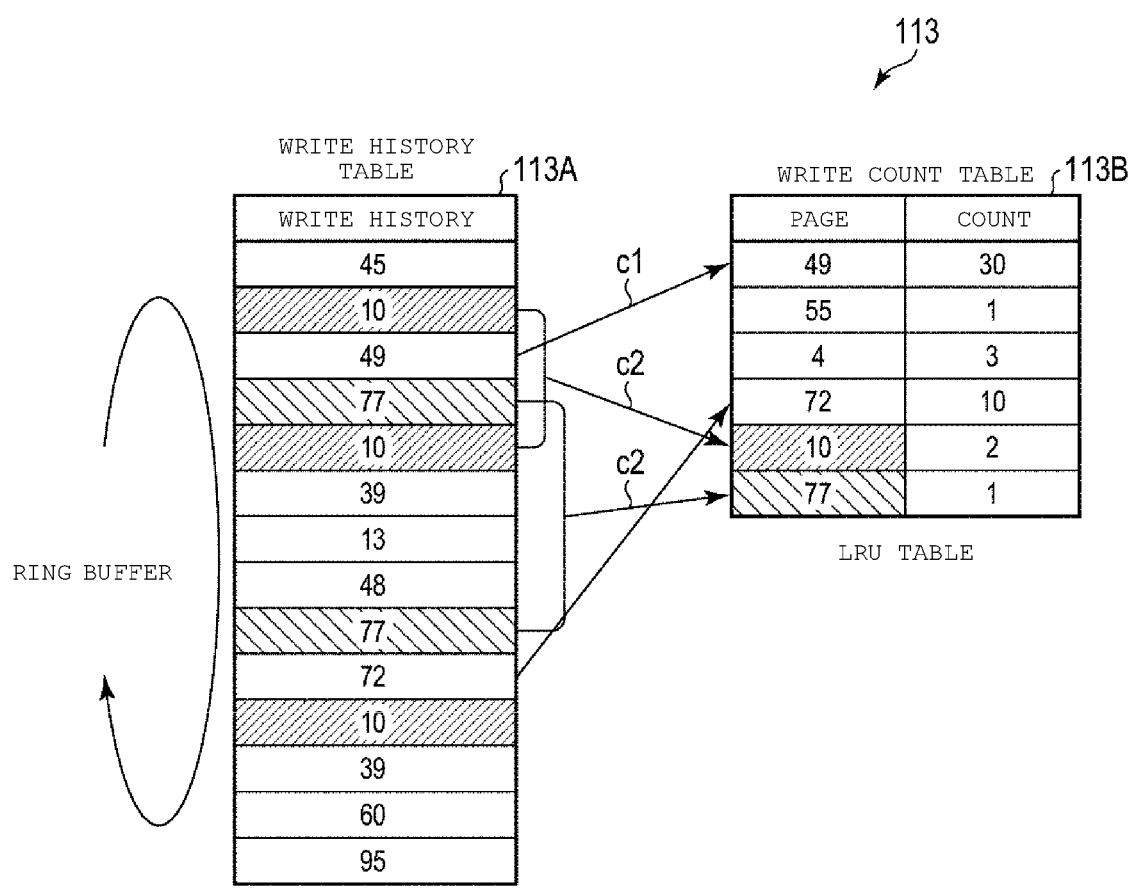
FIG. 7 is a diagram illustrating an implementation example of a page counter in a memory system of a first embodiment.

By setting the indicated bank# from the bank bias determination unit 114 as a target, the page counter 113 adds up the write count for each page of the indicated bank in a certain period based on notifications from the address translation unit 111. FIG. 7 is a diagram illustrating an implementation example of the page counter 113.

The page counter 113 is composed of, for example, a write history table 113A and a write count table 113B. The write history table 113A stores the write history (by page number written) of a target bank in a ring buffer.

The write count table 113B manages the write count for individual page in the target bank. The number of entries in the write count table 113B may be less than the total number of pages in the bank. That is, the write count table 113B may be a least recently used (LRU) table in which after all entries are filled, the least recently used entry is deleted and a new entry is registered.

The page counter 113 uses the write history table 113A and the write count table 113B to add up the write count for each page of the target bank. Specifically, when an entry (a page number) in the write history table 113A matches an entry (a page number) in the write count table 113B, the value (count) of the entry in the write count table 113B is incremented (c1). Further, if there is no matching entry in the write count table 113B, when a duplicate entry is confirmed in the write history table 113A, the entry is registered in the write count table 113B (c2). As a result, the write count for each page is stored in the write count table 113B.

Returning to FIG. 2, the description of wear leveling by the controller 11 will be continued.

The page counter 113 notifies the page bias determination unit 115 of the write count for each page (as added up by the method described with reference to FIG. 7, for example), upon receiving an expiration notification from the interval timer 117 (a17). Therefore, the write count for each bank by the bank counter 112 and the write count for each page of the target bank by the page counter 113, which is determined by adding up the write count for each bank, are shifted for a certain period. However, adding up the write count for each bank by the bank counter 112 and adding up the write count for each page by the page counter 113 are not sequentially processed, but rather can be processed in parallel though corresponding processes are shifted in time/interval (see FIG. 12).

The page bias determination unit 115 detects the occurrence of a bias in the write count between the pages of the target bank based on the write count for each page provided by the page counter 113. For example, when the ratio of the write count of a specific page to the total write count in the target bank is between X% (second threshold) and Y% (third threshold), the page bias determination unit 115 determines that a bias has occurred in the write count, which is supposed to be notified to the wear leveling control unit 116. The reason why the two values a lower bound and upper bound (X% (second threshold) and Y% (third threshold)) are provided will be described below. When detecting the occurrence of a bias in the write count, the page bias determination unit 115 notifies the wear leveling control unit 116 of the page number of the page in which writes are concentrated (a18).

First, if there is a page of which the write count reaches a specified threshold based on the write count information 202 notified (a13) from the address translation unit 111, the wear leveling control unit 116 updates the translation table 201 (a19) and replaces data to be elsewhere on the nonvolatile memory 12 (a03). A plurality of values may be set in stages for a specific threshold. For example, when the write count on a page exceeds the threshold of a first stage, wear leveling may be executed to move the data of that page to another page, and then when the write count of the page exceeds the threshold of a second stage, wear leveling may be executed to move the data of the page to another page. This operation is a known type of wear leveling operation.

Secondly, when notified by both the bank bias determination unit 114 and the page bias determination unit 115 that a bias has occurred in the write count, the wear leveling control unit 116 ignores the write count information 202 and executes an update (a19) of the translation table 201 for moving the data of a page on which writes were concentrated during a certain period to the page of another bank and thus replaces the data on the nonvolatile memory 12. Hereinafter, updating the translation table 201 to move the data of a page in one block to a page of another bank may be simply referred to as moving the page to another bank.

This operation is a wear leveling operation unique to the wear leveling control unit 116 in the memory system 1 of the first embodiment. The page to move in the wear leveling operation is a page in which a concentration of writes was detected by the page bias determination unit 115 that was also on a bank in which a concentration of writes was detected by the bank bias determination unit 114. On the other hand, the destination page can be a page freely selected from the banks having a low write count as detected by the bank bias determination unit 114.

Figure 12:
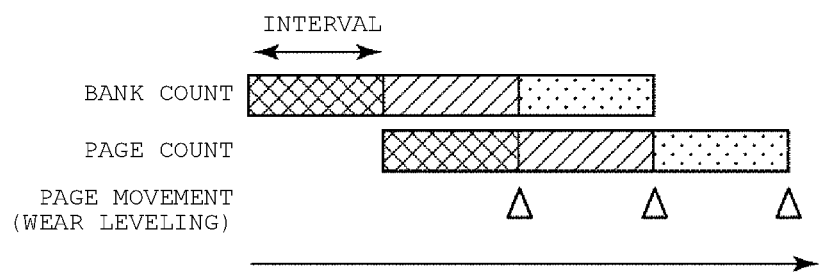
FIG. 12 is a diagram illustrating shifting of processing of bank count, page count, and page movement.

This wear leveling can be shifted from the adding up of the write count for each page of the target bank by the page counter 113 by a certain period. In the memory system 1 of the first embodiment, adding up of the write count for each bank by the bank counter 112, adding up of the write count for each page by the page counter 113, and the wear leveling (unique to the wear leveling control unit 116) can occur in parallel though, as depicted in FIG. 12, steps within a linked processing sequence (write counting for banks; write count for pages in a bank; wear leveling) are shifted in time.

Figure 8:
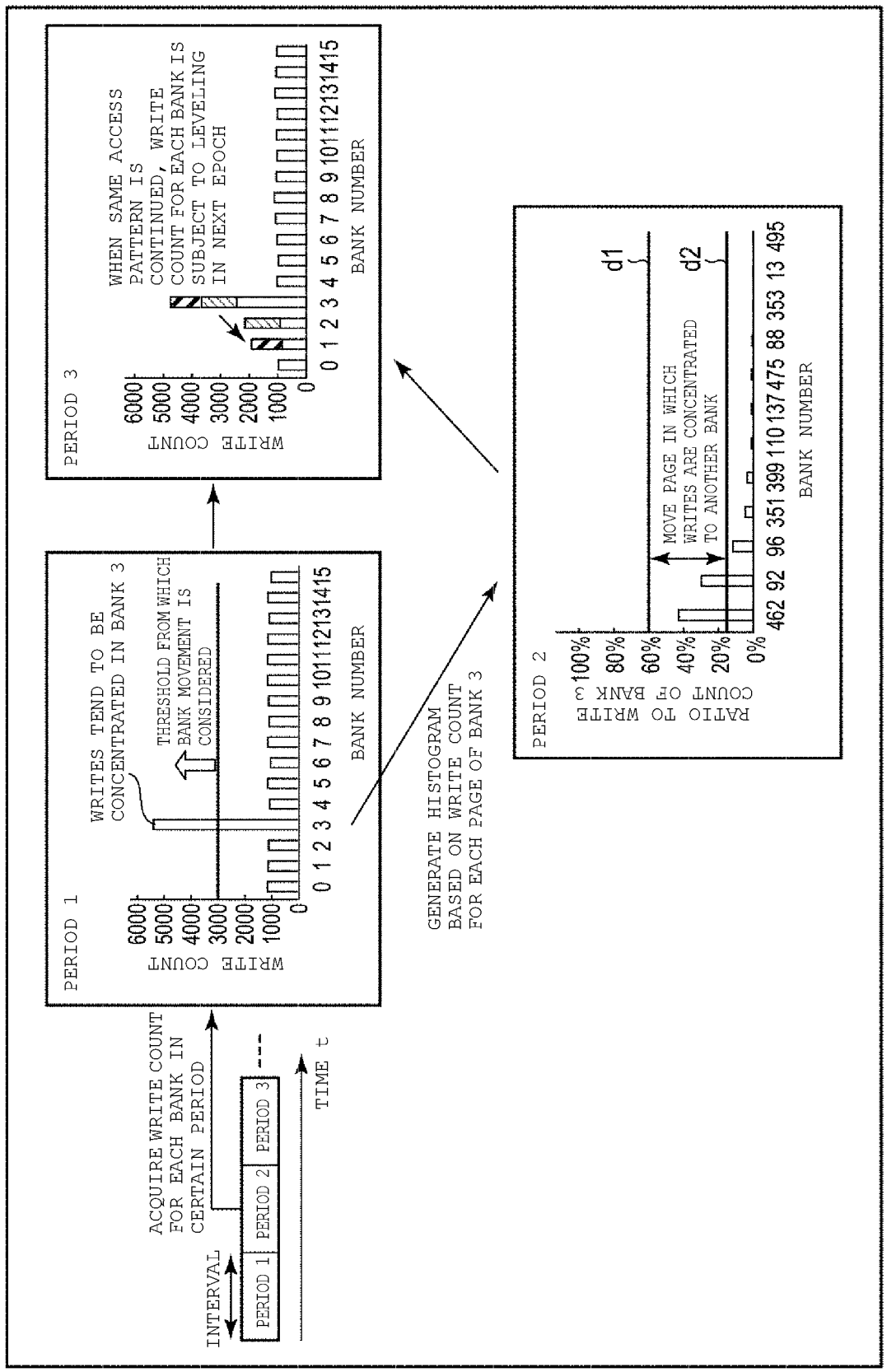
FIG. 8 is a diagram illustrating an outline of wear leveling in a memory system of a first embodiment.

FIG. 8 is a diagram illustrating an outline of wear leveling in the memory system 1 of the first embodiment.

The memory system 1 acquires the write count for each bank by the bank counter 112 at regular intervals timed by the interval timer 117. Here, it is assumed that in a "PERIOD 1" illustrated in FIG. 8, writes tend to be concentrated in a bank 3 and this is detected by the bank bias determination unit 114. In this case, in a "PERIOD 2", the memory system 1 generates a histogram of the ratio of the write count for each page in bank 3 to the total write count in the bank 3 as detected by the page counter 113. The line d2 indicates the above-mentioned X% (second threshold). The line d1 indicates the above-mentioned Y% (third threshold).

The memory system 1 moves the data of the page(s) whose histogram value falls between X% (second threshold) and Y% (third threshold) to another bank. Specifically, the translation table 201 is updated so that the physical address of a page of another bank will now be associated with the logical address previously associated with the physical address of the original page, and the data is moved between the two pages.

If the same access (bias) pattern continues, it can be expected that the write count for each bank will be leveled in a next period 3.

Next, with reference to FIG. 9, a case will be described in which a page is not moved even when the bank bias determination unit 114 detects the occurrence of a bias in the write count of the banks. In other words, in order to detect the occurrence of a bias in the write count across pages, which is supposed to be notified to the wear leveling control unit 116, a reason why an upper and lower bound (X% (second threshold), Y% (third threshold)) are used in the page bias determination unit 115 will be described.

Figure 9:
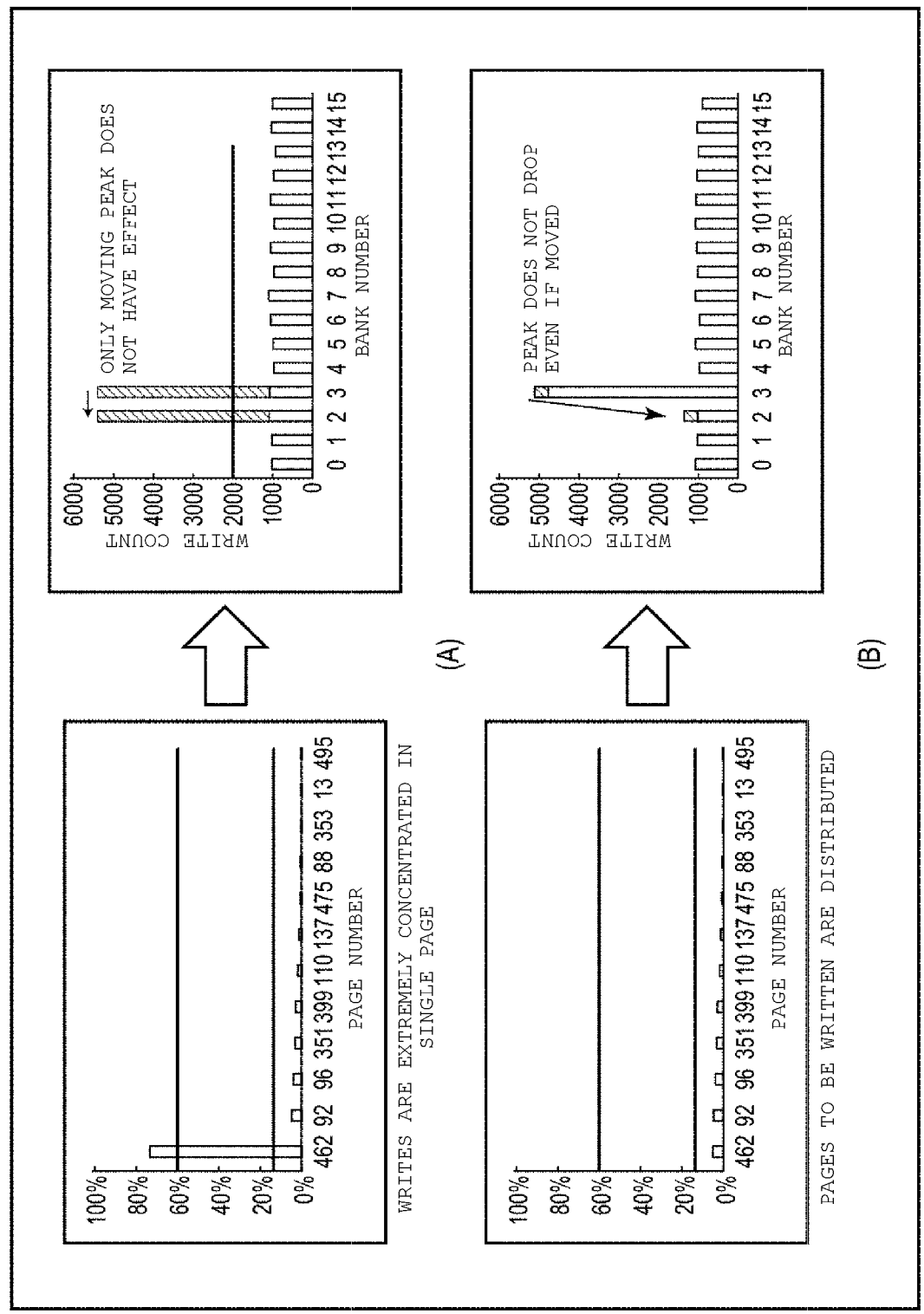
FIG. 9 is a diagram illustrating a reason for providing two comparative values in order to detect the occurrence of a bias in the write count between pages in a memory system of a first embodiment.

Part (A) of FIG. 9 illustrates a case where the ratio of the write count of a page (number 462) to the total write count in a bank exceeds Y% (third threshold) (upper limit). In this case, even if the page is moved to another bank, then the bank in which writes are concentrated just becomes another bank, which has no overall effect.

Part (B) of FIG. 9 illustrates a case where the write count is distributed at or below X% (second threshold) (lower limit) across all the pages in the bank on which writes were concentrated. In this case, even if the page having the highest write count in the bank is moved to another bank, the concentration of writes in the bank is not eliminated, and there is no overall effect.

For the above reasons, in the memory system 1 of the first embodiment, only when the ratio of the write count of a specific page to the total write count is between X% (second threshold) and Y% (third threshold) does the page bias determination unit 115 determines that a bias of a type that should be notified to wear leveling control unit 116 has occurred in the write count).

Figure 10:
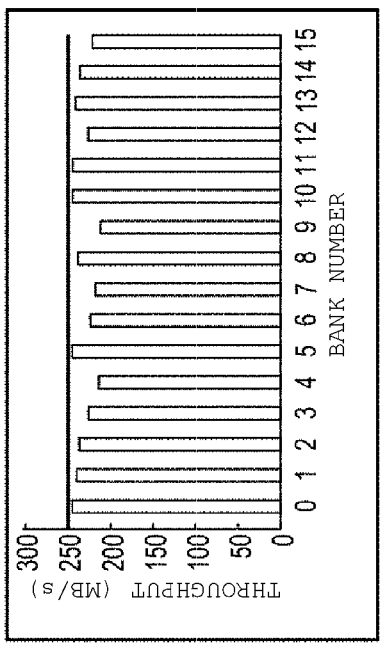
FIG. 10 is a diagram illustrating an effect expected by wear leveling in a memory system of a first embodiment.
Figure 10:
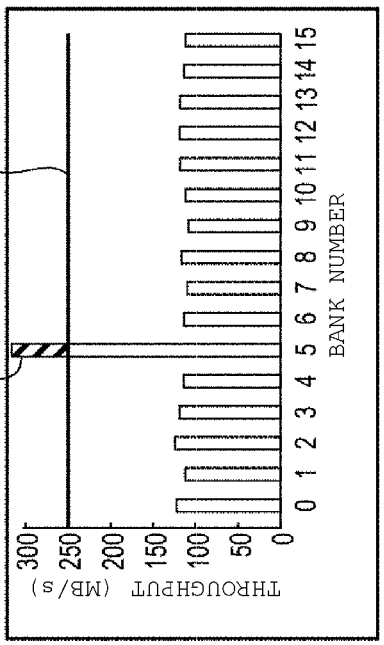

FIG. 10 is a diagram illustrating the effect expected from the wear leveling type unique to the wear leveling control unit 116 in the memory system 1 of the first embodiment.

Part (A) of FIG. 10 illustrates an example of the throughput of the memory system 1 before the data movement across banks is executed by the wear leveling control unit 116. Specifically, the drawing illustrates a state in which data writes were significantly biased to a bank 5.

For example, assuming that the time required for one time of data write is 500 ns (nanoseconds) and one page is 128 bytes, the theoretical throughput of each bank is 256 Mbytes/sec. Further, assuming that the nonvolatile memory 12 has 16 banks, the theoretical maximum value is 4 Gbytes/sec.

However, data writes are being biased to the bank 5, and the data writes on the bank 5 will be clogged, which delays writing to other banks, and the total throughput is limited to about 2 Gbytes/sec.

On the other hand, part (B) of FIG. 10 illustrates an example of the throughput of the memory system 1 after the data movement between banks is executed by the wear leveling control unit 116. Specifically, the drawing illustrates the state after moving the data in a page whose ratio of data writes in the bank 5 is within a specific range to another bank.

As illustrated in FIG. 10, part B, the state in which the bank 5 was a bottleneck has been resolved, and the total throughput has reached about 4 bytes/sec, which is close to the theoretical maximum value.

As described above, in the memory system 1 of the first embodiment, the wear leveling control unit 116 performs wear leveling in consideration of the bias of the data write load to a specific bank of the nonvolatile memory 12, thereby it is possible to increase the effective throughput.

Figure 11:
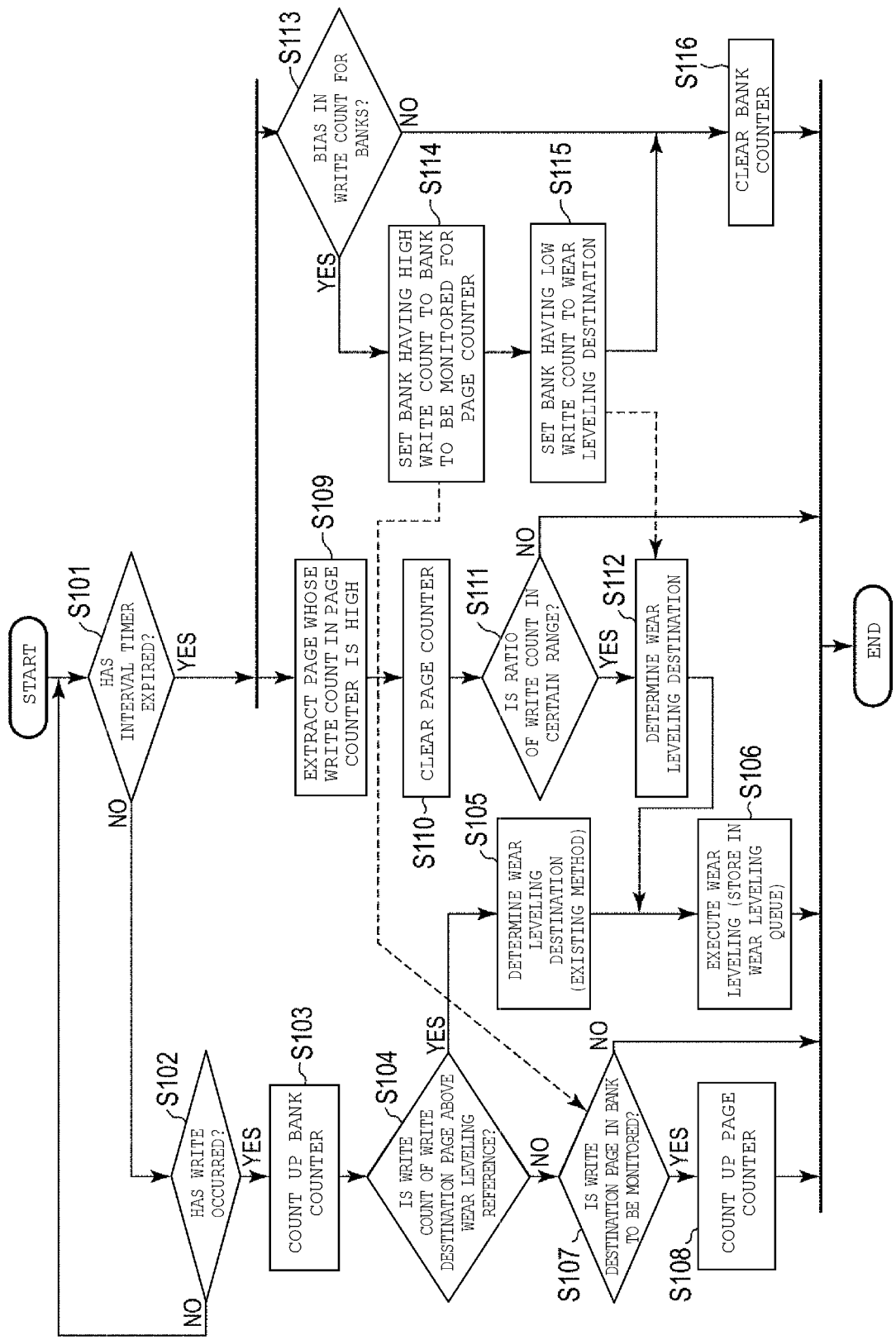
FIG. 11 is a flowchart illustrating operations related to wear leveling of a memory system of a first embodiment.

FIG. 11 is a flowchart illustrating an operation flow related to wear leveling of the memory system 1 of the first embodiment.

The controller 11 first determines whether or not the interval timer 117 has expired (S101). More specifically, the controller 11 determines whether an expiration notification has been transmitted from the interval timer 117. If not (S101: NO), the controller 11 determines whether a data write has occurred (S102). When a data write has occurred (S102:YES), the controller 11 counts up the bank counter 112 for a target bank of a write destination (S103). At this time, the controller 11 also updates the write count information 202.

Subsequently, the controller 11 determines whether or not the write count of a data write destination page is more than a reference value to perform wear leveling (S104). This write count is a value indicated by the write count information 202. In addition, a plurality of values are set by stages for this reference value. When the write count of the page is above the reference value (S104: YES), the controller 11 determines a movement destination of the data of the page (S105) and executes wear leveling (S106). The method of determining the movement destination (bank, page) of the data in S105 is not limited to any specific method, and various existing methods can be applied. Further, the wear leveling for moving data to the movement destination determined in S105 can be a known wear leveling operation for leveling the write count. After performing wear leveling, the controller 11 ends the operation when a data write occurs.

On the other hand, if the write count of a page is less than the reference value (S104: NO), the controller 11 determines whether the page is the page of the bank to be monitored (S107). The bank to be monitored is a bank determined in S114.

The flowchart of FIG. 11 illustrates three separate flow paths, one in which "bank count" (S103) is processed, another in which "page count" (S113 to S116, S107 and S108) is process, and another in which "page movement" (S109 to S112 and S106) processed for a wear leveling in consideration of the bias of a data write load to a partial region of the nonvolatile memory. The processing of these three flows within one linked sequence is shifted by one interval from one another. That is, based on the value of the bank counter 112 that is counted up in S103 during a first interval, the bank to be monitored is determined in S113 to S114 at the beginning of a second interval. As a result, during the second interval, the page counter 113 can be counted up for the monitored bank in S107 to S108. Then, in a third interval, based on the value of the page counter 113 which was counted up in S108 during the second interval, wear leveling is then performed as necessary in S109 to S112, and S106.

If the page is the page of the bank to be monitored (S107: YES), the controller 11 counts up the page counter 113 for that page (S108). When the page counter 113 is counted up, the controller 11 ends the operation when a data write occurs. If the page is not the page of the bank to be monitored (S107: NO), the controller 11 skips the processing of S108 and ends the operation when a data write occurs. Also, if a data write does not occur (S102: NO), the controller 11 returns to the processing of S101.

On the other hand, when the interval timer (117) has expired (S101: YES), the controller 11 extracts the page having a high write count in the page counter 113 (S109). When acquiring the write count of the extracted page and the total write count of the target bank, the controller 11 clears the page counter 113 (S110). The total write count of the target bank may be acquired from the page counter 113 or the bank counter 112.

The controller 11 determines whether the ratio of the write count of the extracted page to the total write count of the target bank is within a certain range (S111). That is, the controller 11 determines whether or not the ratio is between the X% (second threshold) and Y% (third threshold). When the ratio is within the certain range (S111: YES), the controller 11 determines the bank determined in S115 as a movement destination of the data of the page (S112) and executes wear leveling (S106). The controller 11 ends the operation when the interval timer expires. If the ratio is not within the certain range (S111:NO), the controller 11 skips the processing of S112 and S106 and ends the operation when the interval timer expires. The processing of S111 is executed for each of the pages extracted in S109.

Further, when the interval timer (117) has expired (S101: YES), the controller 11 also executes the processing from S113 in parallel with the processing from S109. The controller 11 determines whether or not there is a bias in the write count of data for each bank (S113), which is counted by the bank counter 112. If there is a bias (S113: YES), the controller 11 determines a bank having a high write count as a target bank for counting the write count in the page counter 113 (S114). Further, the controller 11 determines a bank having a low write count as the bank to which the data can be moved by the wear leveling of S112 (S115). The controller 11 clears the bank counter 112 (S116) and ends the operation when the interval timer (117) expires again. On the other hand, if there is no bias in the write count of data for each bank (S113: NO), the controller 11 skips the processing of the S114 and the S115, clears the bank counter 112 (S116), and ends the operation when the interval timer (117) expires again.

As described above, in the memory system 1 of the first embodiment, when the data write load is biased to some banks in the plurality of banks and the data write load is biased to some pages among a plurality of pages of the bank within a certain range, the data of the pages is moved to another bank. The certain range is a case where the ratio of the write count of a page to the total write count in a bank is between X% (second threshold) and Y% (third threshold). As a result, the memory system 1 of the first embodiment can perform wear leveling in consideration of the bias of the data write load to some regions of the nonvolatile memory.

Second Embodiment

Figure 13:
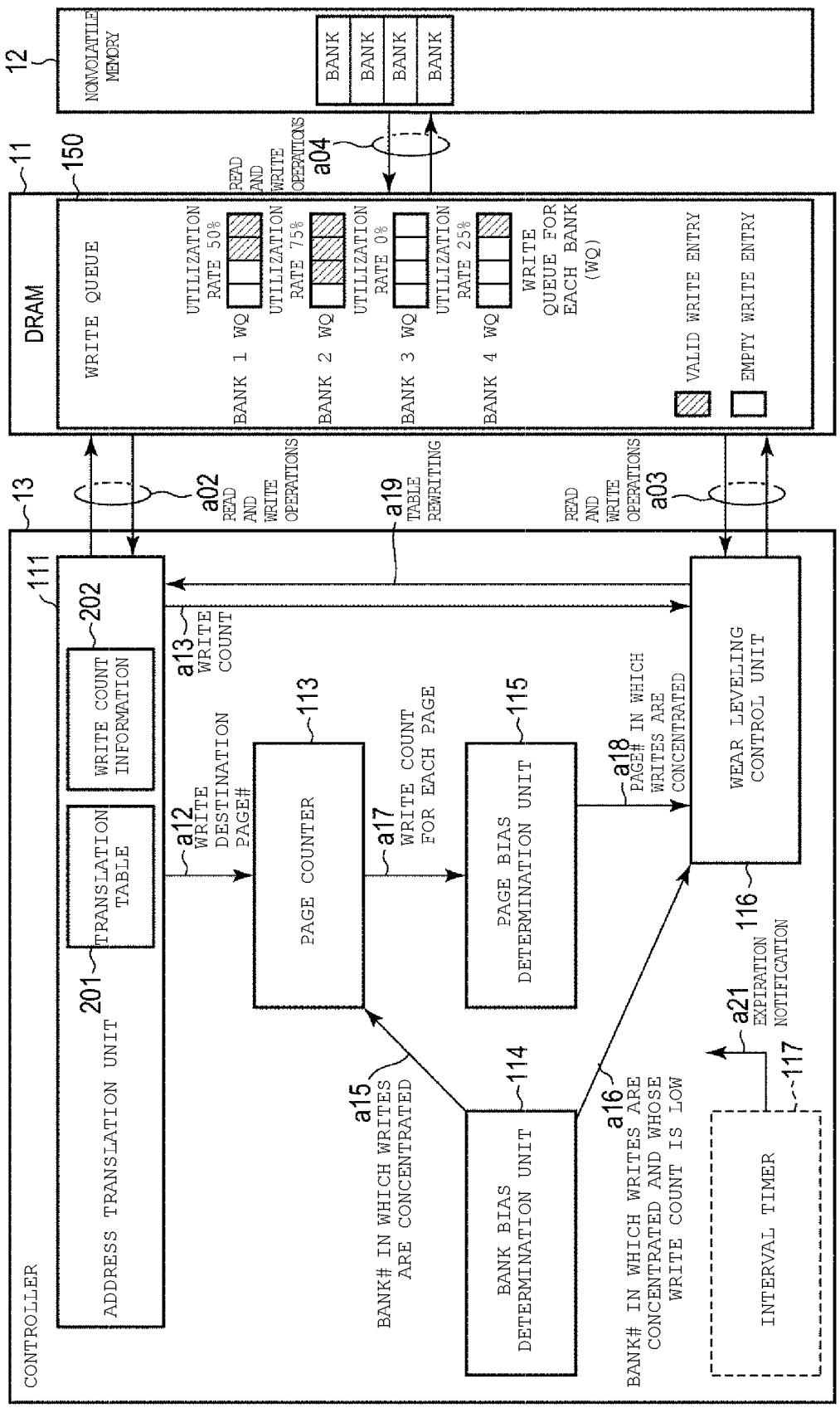
FIG. 13 is a diagram illustrating aspects of a memory system of a second embodiment.

FIG. 13 is a diagram illustrating a configuration example of a memory system 1 of a second embodiment. The same reference numerals are used for the same elements or aspects as those in the first embodiment, and the description of the same elements or aspects will be omitted.

Generally, since it takes time to write data to the nonvolatile memory 12, it is inefficient to wait for the completion each time a write is performed before accepting another write request or the like. A write queue (write buffer) may be implemented to reduce this time loss. Further, since data can be independently read and written from and to the plurality of banks of the nonvolatile memory 12 for each bank, a write queue may be implemented for each bank.

In the first embodiment, the bank counter 112 is used to detect the bias of the data write load across the banks. On the other hand, in the memory system 1 of the second embodiment, a write queue 150 is implemented and the bias of the data write load across the banks is detected based on the utilization rate of the write queue 150.

Specifically, when the bank bias determination unit 114 in the memory system 1 of the second embodiment receives an expiration notification (a22) from the interval timer 117, the bank bias determination unit 114 acquires the utilization rate of the write queue 150 of each bank and detects the bias of the data write load across the banks based thereon. For example, a bank with a utilization rate of the write queue 150 that is higher than or equal to a threshold (first threshold) is detected.

After detecting a bank on which data writes are concentrated, as in the first embodiment, if there is a page on which data writes are concentrated within a certain range among the plurality of pages in the bank, wear leveling is executed to move the data of the page to another bank.

Also in the memory system 1 of the second embodiment, when the data write load is biased to some banks in the plurality of banks and the data write load is further biased within a certain range to some pages among a plurality of pages of the banks, the data of the pages is moved to another bank. That is, the memory system 1 of the second embodiment can also perform wear leveling in consideration of the bias of the data write load to some regions of the nonvolatile memory.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system, comprising:
   a nonvolatile memory that includes a plurality of first regions, data writes and data reads being executable in parallel for the plurality of first regions, each of the first regions including a plurality of second regions as data read/write units; and
   a controller connected to the nonvolatile memory and configured to:
      acquire first values indicating a data write load of each of the plurality of first regions,
      detect a first region having a first value greater than or equal to a first threshold,
      acquire second values indicating a data write load of each of the second regions within the detected first region,
      detect a second region within the detected first region having a second value greater than or equal to a second threshold but less than or equal to a third threshold higher than the second threshold, and
      move data from the detected second region to a second region in a first region other than the detected first region.

2. The memory system according to claim 1, wherein the controller is further configured to:
   acquire values corresponding to a data write load of each of the first regions over a certain time period as the first values, and
   acquire values corresponding to a data write load of each of the second regions in the detected first region over the certain time period as the second values.

3. The memory system according to claim 2, wherein, when data writes are concentrated in a first number of the second regions or less, the third threshold is set based on a ratio of a write load of the first number of second regions to a total write load in the plurality of second regions.

4. The memory system according to claim 2, wherein, when data writes are distributed across a second number or less of the second regions, the second threshold is set based on a ratio of a write load of the second number of second regions to a total write load in the plurality of second regions.

5. The memory system according to claim 2, wherein the controller includes:
   a first counter that adds up a write count for each of the plurality of first regions over the certain time period, and
   a second counter that adds up a write count for each of the plurality of second regions within a first region that has been indicated as a first region to be monitored among the plurality of first regions during the certain time period.

6. The memory system according to claim 5, wherein the controller is further configured to:
   acquire the first value for each of the plurality of first regions from a total write count for the plurality of first regions and the write count for each of the plurality of first regions, which are obtained by the first counter, and
   acquire the second value for each of the plurality of second regions from a total write count for the plurality of second regions and the write count for each of the plurality of second regions, which are obtained by the second counter.

7. The memory system according to claim 2, further comprising:
   a plurality of queues provided on a one-to-one basis with the plurality of first regions, the queues for temporarily storing write data for the plurality of first regions, wherein
   the controller is configured to acquire the first value for each of the plurality of first regions based on utilization rates of each of the plurality of queues.

8. The memory system according to claim 7, wherein the controller includes a counter configured to add up a write count for each of the plurality of second regions in the first region being monitored among the plurality of first regions in the certain time period.

9. The memory system according to claim 8, wherein the controller is further configured to acquire the second value of each of the plurality of second regions from a total write count of the plurality of second regions and the write count of each of the plurality of second regions, which are obtained by the counter.

10. A controller for controlling a nonvolatile memory that includes a plurality of first regions in which data writes and data reads are executable in parallel, each of the first regions including a plurality of second regions which are each a data write/read unit, the controller configured to:
    acquire first values indicating a data write load of each of the plurality of first regions;
    detect a first region having a first value greater than or equal to a first threshold;
    acquire second values indicating a data write load of each of the second regions within the detected first region,
    detect a second region within the detected first region having a second value greater than or equal to a second threshold but less than or equal to a third threshold that is higher than the second threshold; and
    move data from the detected second region to a second region in a first region other than the detected first region.

11. The controller according to claim 10, wherein the controller is further configured to:
  acquire values corresponding to a data write load of each of the first regions over a certain time period as the first values; and
  acquire values corresponding to a data write load of each of the second regions in the detected first region over the certain time period as the second values.

12. The controller according to claim 11, wherein, when data writes are concentrated in a first number of the second regions or less, the third threshold is set based on a ratio of a write load in the first number of second regions to a total write load in the plurality of second regions.

13. The controller according to claim 11, wherein, when data writes are distributed across a second number or less of the second regions, the second threshold is set based on a ratio of a write load in the second number of second regions to a total write load in the plurality of second region.

14. The controller according to claim 11, the controller comprising:
  a first counter that adds up a write count for each of the plurality of first regions over the certain time period; and
  a second counter that adds up a write count for each of the plurality of second regions within the first region that has been indicated as a first region to be monitored among the plurality of the first regions during the certain time period.

15. The controller according to claim 14, wherein the controller is further configured to:
  acquire the first value for each of the plurality of first regions from a total write count for the plurality of first regions and the write count for each of the plurality of first regions, which are obtained by the first counter, and
  acquire the second value for each of the plurality of second regions from a total write count for the plurality of second regions and the write count for each of the plurality of second regions, which are obtained by the second counter.

16. The controller according to claim 11, wherein the controller is further configured to acquire the first value for the plurality of first regions based on a utilization rate of a plurality of queues provided on a one-to-one basis with the plurality of first regions, the queues for temporarily storing write data for the plurality of first regions.

17. The controller according to claim 16, further comprising:
  a counter configured to add up a write count for each of the plurality of second regions in the first region being monitored among the plurality of first regions in the certain time period.

18. The controller according to claim 17, wherein the controller is further configured to acquire the second value for each of the plurality of second regions from a total write count for the plurality of second regions and the write count for each of the plurality of second regions, which are obtained by the counter.

19. A wear leveling method for a nonvolatile memory that includes a plurality of first regions in which a data writes and data reads are executable in parallel, each of the plurality of first regions including a plurality of second regions which are each a data write/read unit, the method comprising:
  acquiring first values indicating a data write load of each of the plurality of first regions;
  detecting a first region having a first value greater than or equal to a first threshold;
  acquiring second values indicating a data write load of each of the plurality of second regions within the detected first region;
  detecting a second region within the detected first region having a second value greater than or equal to a second threshold but less than or equal to a third threshold that is higher than the second threshold; and
  moving data from the detected second region to a second region in a first region other than the detected first region.

20. The wear leveling method according to claim 19, wherein, when data writes are concentrated in a first number of the second regions or less, the third threshold is set based on a ratio of a write load in the first number of second regions to a total write load in the plurality of second regions.

* * * * *